US011808398B2

(12) United States Patent
Esnault

(10) Patent No.: US 11,808,398 B2
(45) Date of Patent: *Nov. 7, 2023

(54) ULTRA-HIGH PERFORMANCE FIBRE-REINFORCED CONCRETE PIPE FOR PRESSURIZED FLUID TRANSPORT

(71) Applicant: IFP Energies nouvelles, Rueil-Malmaison (FR)

(72) Inventor: Vivien Esnault, Rueil-Malmaison (FR)

(73) Assignee: IFP Energies nouvelles, Rueil-Malmaison (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/717,534

(22) Filed: Apr. 11, 2022

(65) Prior Publication Data
US 2022/0333718 A1 Oct. 20, 2022

(30) Foreign Application Priority Data

Apr. 14, 2021 (FR) ...................................... 2103859

(51) Int. Cl.
*F16L 9/00* (2006.01)
*F16L 9/153* (2006.01)
*C04B 20/00* (2006.01)
*F16L 9/08* (2006.01)
*F16L 9/14* (2006.01)
*F16L 59/147* (2006.01)

(52) U.S. Cl.
CPC .......... *F16L 9/153* (2013.01); *C04B 20/0048* (2013.01); *C04B 20/0096* (2013.01); *F16L 9/085* (2013.01); *F16L 9/14* (2013.01); *F16L 59/147* (2013.01)

(58) Field of Classification Search
CPC ... F16L 9/153; F16L 9/085; F16L 9/14; F16L 59/147; C04B 20/0048; C04B 20/0096
USPC .................................................. 138/175, 176
See application file for complete search history.

(56) References Cited

U.S. PATENT DOCUMENTS 2,707,003 A * 4/1955 Kennison ............ F16L 25/0027
277/625
3,005,469 A * 10/1961 Kenney ..................... F16L 9/08
264/308

(Continued)

FOREIGN PATENT DOCUMENTS

CN 106247030 A 12/2016
CN 106287008 A 1/2017
(Continued)

OTHER PUBLICATIONS

Preliminary Search Report dated Dec. 22, 2021 in French Application No. 2103859.

*Primary Examiner* — James F Hook
(74) *Attorney, Agent, or Firm* — FITCH, EVEN, TABIN & FLANNERY, LLP

(57) ABSTRACT

A pipe for transporting gas, notably carbon dioxide, includes at least one tubular element, tubular element consisting of a juxtaposition of concentric layers including, from inside to outside, at least one sealing layer, a wall including a prestressed concrete layer and at least one circumferential mechanical reinforcement layer. Furthermore, the concrete making up prestressed concrete layer is selected from among the ultra-high performance fibre-reinforced concretes (UHP-FRC).

14 Claims, 6 Drawing Sheets

(56) References Cited

U.S. PATENT DOCUMENTS

| | | | | | |
|---|---|---|---|---|---|
| 3,106,227 | A | * | 10/1963 | Crowley | B65D 90/06 |
| | | | | | 52/223.3 |
| 3,228,425 | A | * | 1/1966 | Pacella | F16L 13/113 |
| | | | | | 285/293.1 |
| 3,247,294 | A | * | 4/1966 | Sabouni | C04B 41/009 |
| | | | | | 428/312.4 |
| 3,282,301 | A | * | 11/1966 | Ligon | F16L 59/029 |
| | | | | | 138/175 |
| 3,382,680 | A | * | 5/1968 | Tamio | E02D 5/58 |
| | | | | | 52/223.5 |
| 3,520,749 | A | * | 7/1970 | Rubenstein | B29C 48/50 |
| | | | | | 425/389 |
| 3,532,132 | A | * | 10/1970 | Rubenstein | F16L 1/038 |
| | | | | | 138/172 |
| 2015/0323104 | A1 | * | 11/2015 | Subacchi | F16L 9/085 |
| | | | | | 138/109 |

FOREIGN PATENT DOCUMENTS

| | | |
|---|---|---|
| CN | 111216232 A | 6/2020 |
| CN | 111473167 A | 7/2020 |

* cited by examiner

[Fig 1]
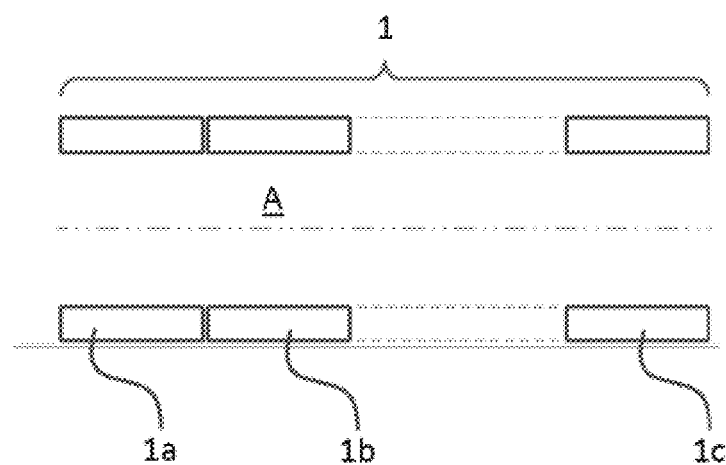

[Fig 2]
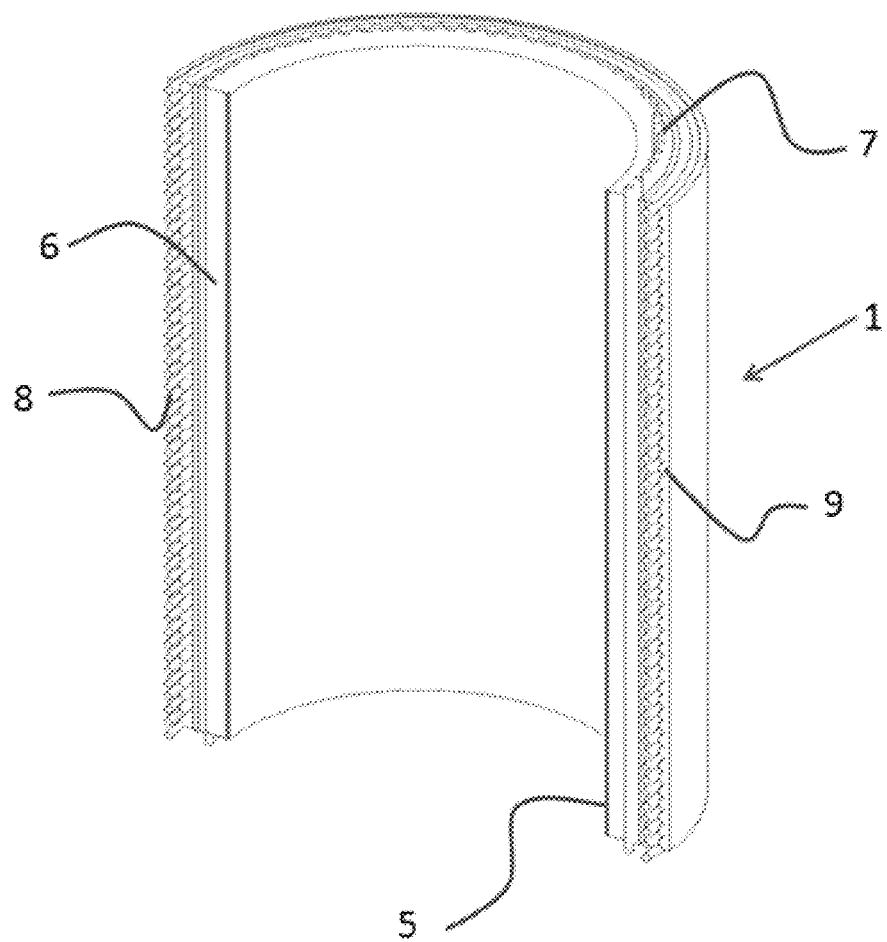

[Fig 3]
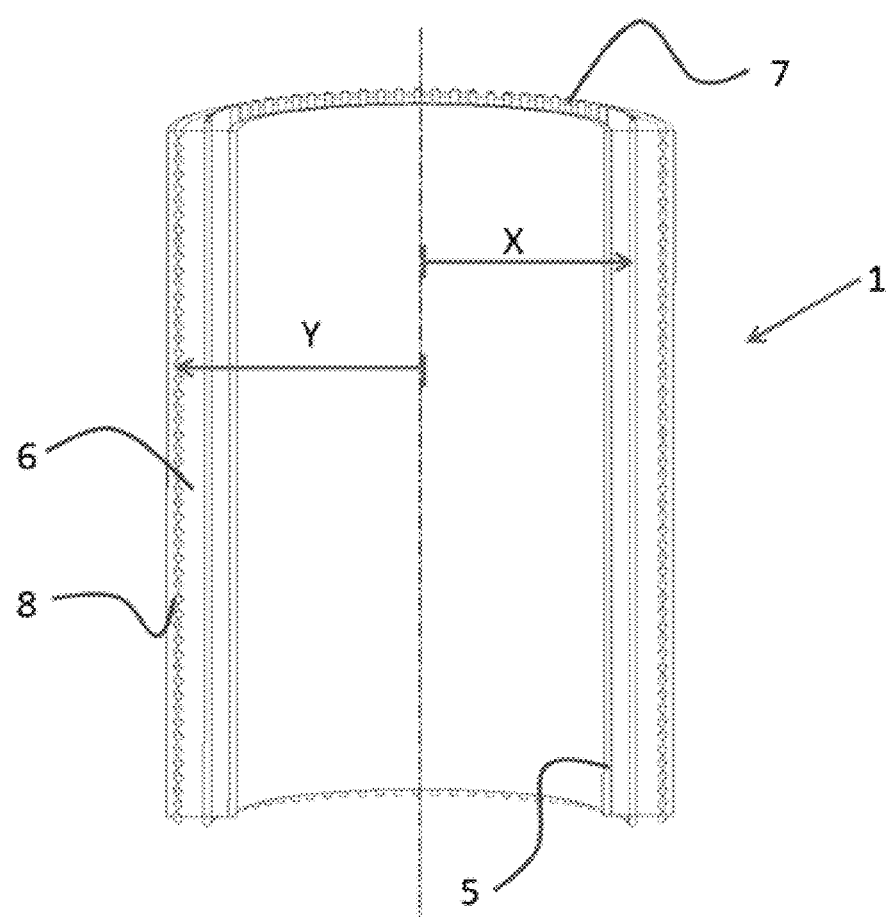

[Fig 4]
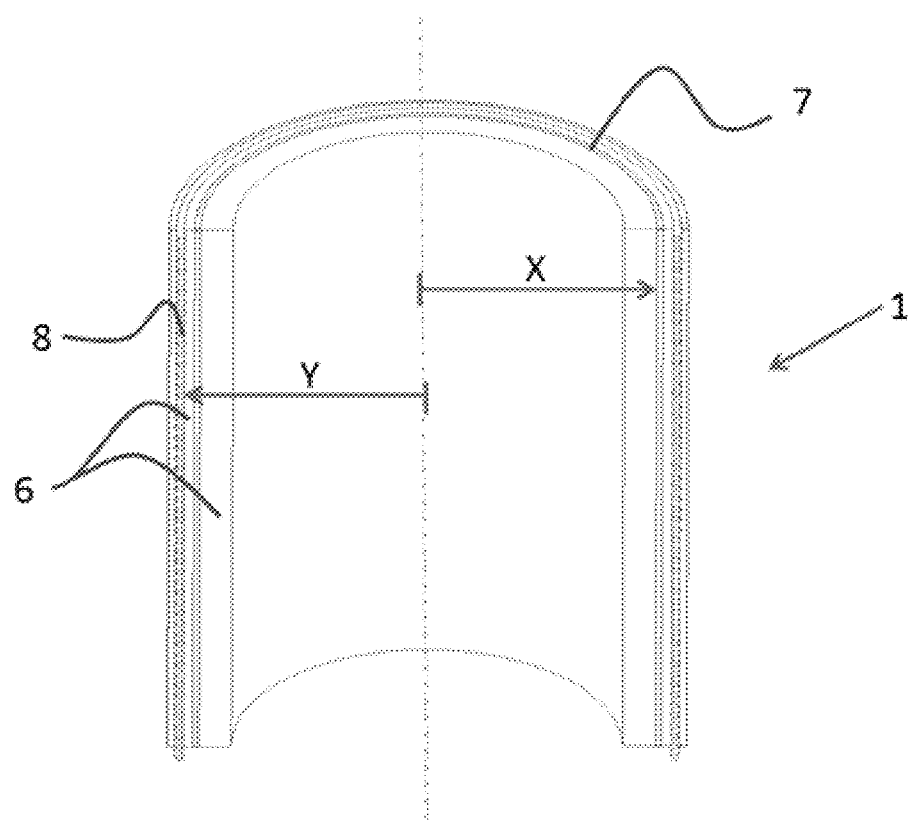

[Fig 5]
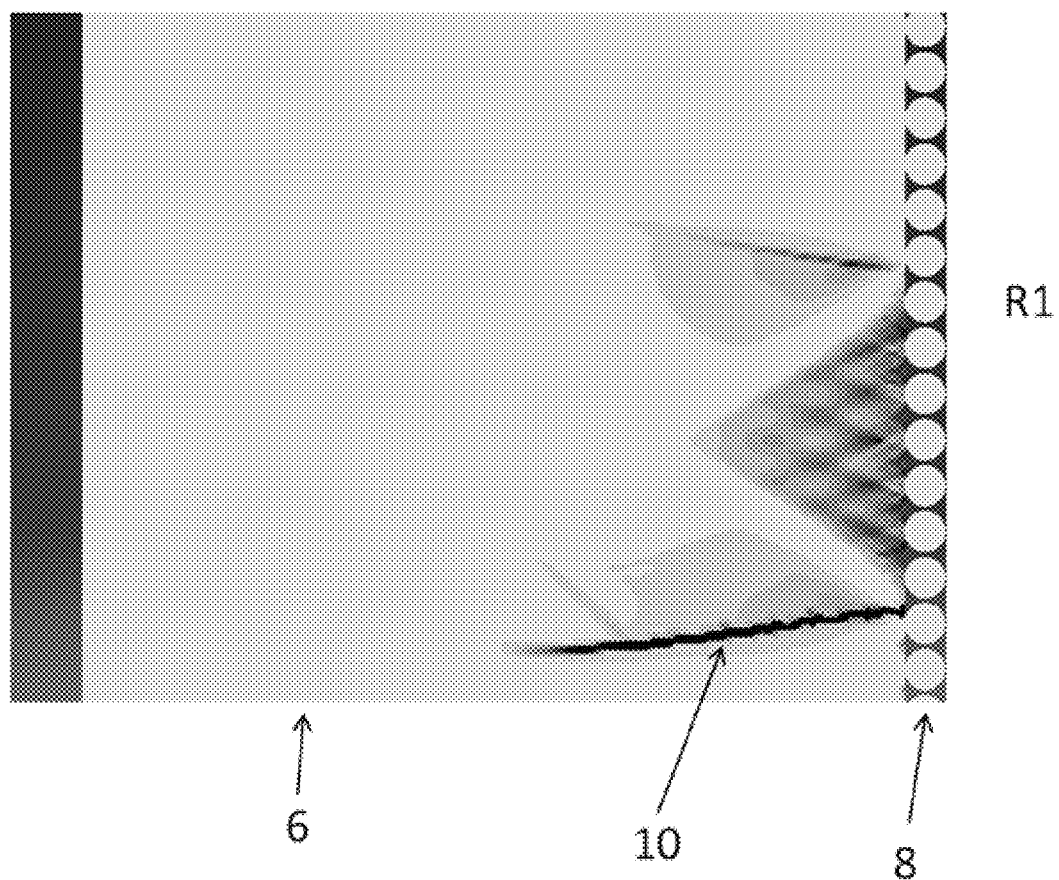

[Fig 6]
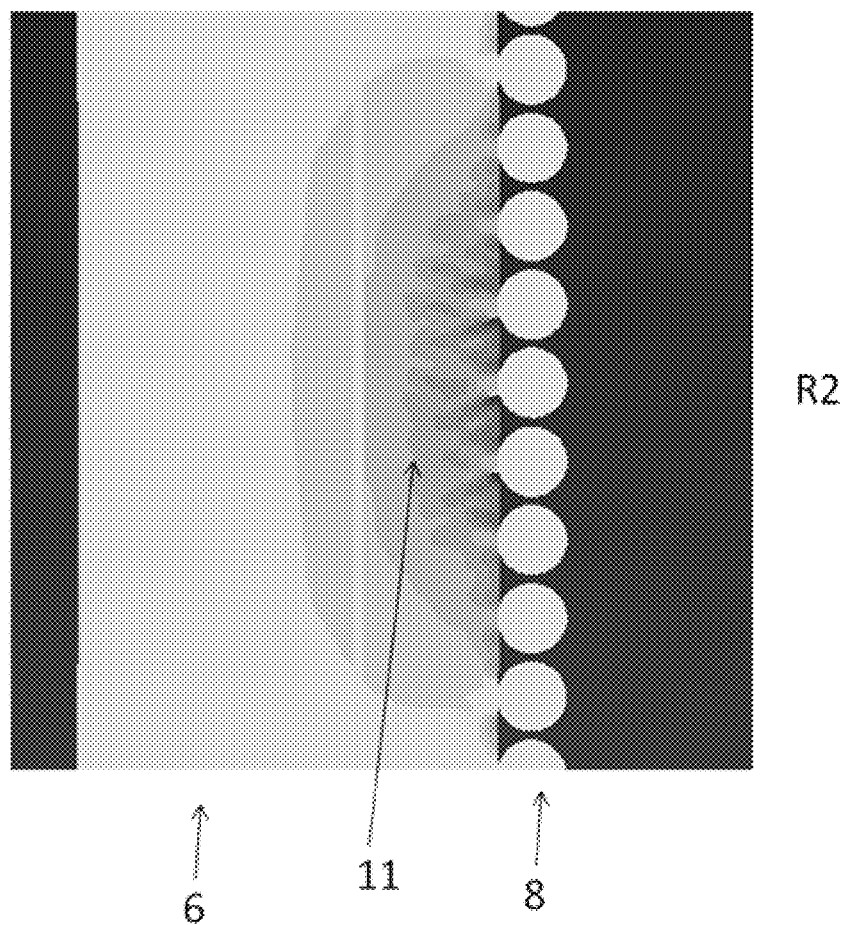
[Fig 7]
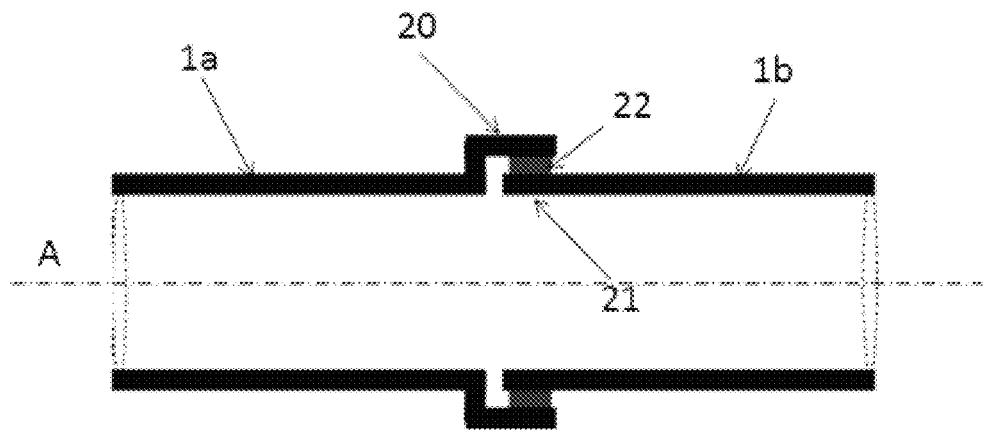

ULTRA-HIGH PERFORMANCE FIBRE-REINFORCED CONCRETE PIPE FOR PRESSURIZED FLUID TRANSPORT

CROSS-REFERENCE TO RELATED APPLICATIONS

This application is claims benefit of the filing date of French Patent Application No. 2103859, filed Apr. 14, 2021, which is incorporated herein by reference in its entirety.

FIELD OF THE INVENTION

The present invention relates to the field of pressurized fluid transport, notably gas and more particularly carbon dioxide $CO_2$, for the purpose of storage and sequestration, or of re-use to increase the recovery ratio of oil and gas production wells (EOR).

BACKGROUND OF THE INVENTION

Pipes are generally used for carrying a fluid over long distances; they are known as pressurized fluid transport pipes.

Potable water transport is generally performed at low pressure (pressure ranging between 18 and 30 bar) in metal or PVC (polyvinyl chloride) pipes. Prestressed concrete pipes are also used. However, the use of prestressed concrete is limited to these low-pressure applications, mainly because of the risk of pipe breakage, since ordinary concrete is not a ductile material.

Fluids, gas or liquid, at a pressure above 15 bar (1.5 MPa) are generally transported in metal pipes so as to guard against the risk of pipe breakage. These metal pipes are selected in a material having a ductile behaviour allowing to limit the risk of burst pipe intrinsic to the behaviour of the material and enabling in-service monitoring through crack study/control.

A material with a ductile behaviour is understood to be a material having the ability to be plastically deformed (permanently) without breaking suddenly. In contrast, a brittle behaviour is when the material can break suddenly, as it is notably the case with ordinary concrete.

More particularly, $CO_2$ transport has been widely developed by the United States since the 1970s in order, on the one hand, to re-use this environmentally harmful gas and, on the other hand, to increase the recovery ratio of oil production wells (EOR technique).

In 2016, the $CO_2$ transport network was already 6000 km long in North America, for a total capacity of the order of 50 Mt/year.

During construction of a new network, the gas flow rate, depending on the site of production with capture and on the usage thereof, is on average 150 kg/s, for a length ranging between 90 and 900 km. The $CO_2$ is preferably conditioned in the supercritical state in order to maximize the flow rate and to optimize the investment and transport costs. The critical point of pure $CO_2$ being 73.8 bar for a temperature of 31.06° C., the transport pressure generally ranges between 100 and 150 bar, and the temperature is kept at ambient temperature (between 13° C. and 44° C.). To facilitate temperature control and to limit pipe breakage risks under the effect of corrosion, or damage due to external mechanical aggression, the network is in most cases buried and far away from residential areas.

$CO_2$ is a reactive gas. Dissolved in water, it may cause severe corrosion of steel pipes. Some standards (ASTM304 for example) impose a regulation on the steel grades to be used or on the chemical compounds that can be transported with $CO_2$, as it is not uncommon for the capture station to produce $CO_2$ with impurities whose proportion varies according to the capture type used. Typically, captured $CO_2$ may contain non-condensable gases (nitrogen gas $N_2$, oxygen $O_2$ or argon Ar for example), as well as nitrogen oxides NOx, hydrogen sulfide $H_2S$, sulfur dioxide $SO_2$, carbon dioxide CO, methane $CH_4$, hydrogen $H_2$, ammonia $NH_3$ and water. The mass fraction of water in vapour form is thus limited to 0.025% for $CO_2$ capture and storage systems, because it has been observed that other gaseous impurities such as $CO_2$, NOx, Sox or $H_2$, even in small amounts, increase the corrosive effects of the mixture.

Depending on the impurities in the flows, various steel grades (X65, 304L for example) can be used, with sometimes very high costs. Corrosion allowances are also adopted for the pipes, which raises the costs even more.

Thus, even though the manufacturing and laying cost of steel pipes for $CO_2$ transport was relatively low in the 1970s, given the increase in the cost of materials, using steel pipes for $CO_2$ transport is now expensive and may represent up to 20% of the $CO_2$ capture and storage chain depending on the case studied.

The object of the invention consists in providing a new pipe technology allowing production and laying costs to be reduced while ensuring safety of the equipment subjected to high pressures (at least above 70 bar, i.e. at least 7 MPa), notably by preventing pipe burst risks under the effect of the internal pressure and by limiting corrosion risks.

SUMMARY OF THE INVENTION

The objective is achieved with a pipe for transporting gas, notably carbon dioxide, comprising at least one tubular element, the tubular element consisting of a juxtaposition of concentric layers comprising, from inside to outside, at least one sealing layer, a prestressed concrete layer (also referred to as wall including a prestressed concrete layer) and at least one circumferential mechanical reinforcement layer. Furthermore, the concrete making up the prestressed concrete layer is selected from among the ultra-high performance fibre-reinforced concretes. Thus, the pipe is configured (dimensioned) to withstand a pressure greater than 70 bar (7 MPa), typically up to pressures allowing transport of $CO_2$ in supercritical state (150 bar).

Preferably, the concrete making up the prestressed concrete layer is selected from among ultra-high performance fibre-reinforced concretes comprising steel fibres and having a compressive strength greater than 130 MPa.

Advantageously, the concrete making up the prestressed concrete layer is selected from among ultra-high performance fibre-reinforced concretes meeting at least one of the following criteria:
- the prestressed concrete comprises aggregates of different sizes, the maximum size of the aggregates being less than 7 mm, preferably less than 1 mm, and the proportion of aggregates of grain size d50<5 μm being at least greater than 50 kg/m³ concrete,
- a proportion of cement ranging between 700 and 1000 kg/m³ concrete,
- a water/cement mass ratio ranging between 0.15 and 0.25,
- a proportion of additives, in dry extract, ranging between 10 and 35 kg/m³ concrete,
- a proportion of fibres ranging between 2% and 10% by volume.

According to one configuration of the invention, the circumferential mechanical reinforcement layer is made up of circumferential metal elements arranged around or in the prestressed concrete layer, the circumferential metal elements being tensionally prestressed.

Preferably, the circumferential metal elements are selected from among metal wires, metal bands, metal rings, metal cables.

According to one implementation of the invention, the tubular element further comprises a protective layer arranged on the outer surface of the prestressed concrete layer, and the circumferential mechanical reinforcement layer can be embedded in the protective layer.

According to one variant of the invention, the prestressed concrete layer (the wall) comprises at least one axial mechanical reinforcement layer consisting of one or more longitudinal metal elements arranged in the prestressed concrete layer, said one or more longitudinal metal elements being tensionally prestressed.

Advantageously, said one or more longitudinal metal elements is selected from among a metal tube, metal wires, metal cables or metal bands.

According to one embodiment of the invention, said sealing layer is selected from among a metal layer, notably made of steel, a polymer layer, notably made of polytetrafluoroethylene, or a juxtaposition of an inner concrete sublayer and an outer metal sublayer, notably made of steel, or a polymer sublayer, notably made of polytetrafluoroethylene.

Preferably, the pipe comprises a plurality of tubular elements, each tubular element comprising a male fitting end or a female fitting end at each longitudinal end of the tubular element, so as to be able to assemble two tubular elements with one another, the male fitting end or the female fitting end comprising a seal means.

According to one configuration of the invention, the tubular element comprises a thermal insulation layer positioned against the inner surface of the sealing layer. The thermal insulation layer is preferably made of cellular concrete.

BRIEF DESCRIPTION OF THE FIGURES

Other features and advantages of the device according to the invention will be clear from reading the description hereafter of embodiments given by way of non-limitative example, with reference to the accompanying figures wherein:

FIG. 1 schematically illustrates a pressurized gas transport pipe according to one embodiment of the invention, FIG. 2 illustrates the running section of a tubular element according to a first embodiment of the invention, FIG. 3 illustrates the running section of a tubular element according to a second embodiment of the invention, FIG. 4 illustrates the running section of a tubular element according to a third embodiment of the invention, FIG. 5 shows the computer simulation results for the behaviour of a tubular element under internal pressure with an ordinary concrete layer according to the prior art, FIG. 6 shows the computer simulation results for the behaviour of a tubular element under internal pressure made of ultra-high performance fibre-reinforced concrete according to the invention, and FIG. 7 shows an example of assembly with male and female fitting ends at the ends of the tubular elements according to the invention.

DETAILED DESCRIPTION OF THE INVENTION

The invention relates to a pipe for transporting gas, notably carbon dioxide $CO_2$, comprising at least one tubular element, preferably with several tubular elements assembled to one another so as to form a several kilometer-long pipe. The tubular element consists of a juxtaposition of concentric layers comprising, from inside to outside, at least one sealing layer, a prestressed concrete layer and at least one circumferential mechanical reinforcement layer for prestressing the concrete.

These layers are referred to as juxtaposed and concentric because they are arranged around one another with no empty space between them. In other words, the inside diameter (or the distance to the centre of the tubular element in case of a non-circular section) of an outer layer corresponds to the outside diameter (or the distance to the centre of the tubular element in case of a non-circular section) of an inner layer consecutive to the outer layer. A layer forms a continuous wall having the shape of the running section.

Concrete is a material having a much higher mechanical compressive than tensile strength. Indeed, when subjected to low tensile stresses, concrete tends to crack: the maximum tensile strength is generally less than 5 MPa for ordinary concrete. The prestress applied to the concrete by the circumferential mechanical reinforcement layer allows the concrete to undergo an initial compressive load so as to artificially increase its resistance to the internal pressure (which generates tensile stresses in the concrete). Thus, a prestressed concrete thickness is better able to withstand a higher internal pressure than the same thickness of the same concrete without prestress.

Concrete prestress is generated by inner metal elements that are set while pouring the concrete. These inner metal elements are kept under tension (in other words, a tensile stress is applied to these inner metal elements) while pouring the concrete and throughout the concrete drying stage. Once the concrete dry, the tension on the inner metal elements is released (no tension is applied any longer). This release of the inner metal elements causes compressive prestress of the concrete.

In the present document, what is referred to as "internal pressure" is the absolute pressure within the pipe or the overpressure within the pipe, the overpressure then corresponding to the difference between the absolute pressure within the pipe and the absolute pressure outside the pipe.

The inner sealing layer is intended to prevent the inner fluid from coming into direct contact with the concrete and/or the circumferential mechanical reinforcement layer.

This is particularly advantageous for preventing concrete carbonation phenomena, notably when the fluid is $CO_2$ that may attack the concrete layer and/or the circumferential mechanical reinforcement layer. However, it is noted that carbonation, by which $CO_2$ penetrates into the concrete pores, leads to partially clogged pores, which contributes to reducing the porosity. This phenomenon is nearly zero when the $CO_2$ is dehydrated.

Besides, the concrete making up the prestressed concrete layer is selected from among ultra-high performance fibre-reinforced concretes. Thus, the pipe is configured to withstand a pressure greater than 70 bar so as to allow a fluid (notably gas) to be transported over long distances of several kilometers, preferably several hundred kilometers.

Gas transport pipes have an outside diameter generally less than 1.2 m (preferably strictly less than 1 m and more preferably less than 0.8 m), with an optimum diameter allowing the largest possible gas mass flow rate to be transported at the lowest possible cost. Furthermore, a small diameter allows to limit the pipe thickness required for internal pressure strength, and therefore to reduce the manufacturing cost. Thus, the tubular element(s) of the pipe have an outside diameter less than 1 m, preferably less than 0.8 m.

Concrete is understood to be a mixture comprising aggregates (also referred to as gravel or grit), sand, cement and water. It may also contain adjuvants and additives and/or fibres. The properties of concrete develop through hydration.

Mortar is a mixture comprising sand, water and cement. Unlike concrete, it contains no aggregates (gravel). It may also contain adjuvants, additives and/or fibres. The properties of mortar develop through hydration, like concrete.

Ultra-high performance fibre-reinforced concrete is understood to be concrete reinforced with fibres that can be metallic and/or with polymer fibres whose compressive strength is greater than 130 MPa, preferably close to 150 MPa.

In contrast to ultra-high performance fibre-reinforced concrete, "conventional" or "usual" or "ordinary" concrete is understood to be a concrete in the sense of the NF EN 206 standard, having a compressive strength less than 100 MPa.

The ultra-high performance fibre-reinforced concretes (UHPFRC) used in the present invention can be defined by the NF P18-470 standard. It defines UHPFRCs as "concretes characterized by a high compressive strength, greater than 130 MPa, beyond the field of application of the NF EN 206/CN:2014 standard, by a high post-cracking tensile strength allowing to have a ductile behaviour under tensile stress, and whose non-brittleness allows to calculate and to produce structures and structure elements without using reinforced concrete reinforcements". Of course, UHPFRCs can be used with reinforced concrete reinforcements or prestress reinforcements.

More precisely, according to one embodiment of the invention, an ultra-high performance fibre-reinforced concrete (UHPFRC) of the BFUP-S class in the sense of the NF P18-470 standard is used, i.e.:
- a UHPFRC comprising steel fibres. Thus, the UHPFRC has post-cracking strength properties that are provided by steel fibres. The steel fibres can be defined as "straight or deformed elements from cold-drawn wire, cut sheet, melt extracts, shaped cold-drawn wire or milled steel blocks". The steel fibres can have the following geometric dimensions: diameter from 0.1 to 0.3 mm, length ranging between 10 and 20 mm;
- a UHPFRC having a compressive strength greater than 150 MPa, measured according to the NF EN 12390-3:2012 standard.

Preferably, a UHPFRC belonging to the tensile behaviour class T2 (low strain-hardening) or T3 (high strain-hardening) according to the NF P18-470 standard is selected.

According to one embodiment of the invention, a UHPFRC having a composition meeting the following criteria, alone or in combination, can be selected:
- the UHPFRC comprises aggregates of different sizes, the maximum aggregate size being less than 7 mm, preferably less than 1 mm. Thus, the UHPFRC is characterized by an upper size limit for the aggregates used: maximum size 7 mm, preferably maximum size 1 mm;
- a proportion of cement (also referred to as binder) ranging between 700 and 1000 kg/m³ concrete, i.e. a very high proportion of cement, the proportion of ordinary concrete (non-UHPFRC) being generally less than 400 kg/m³. Preferably, a 52.5 grade cement defined by the NF EN 197-1 standard is used;
- the UHPFRC has a proportion of very fine particles with a grain size distribution d50<5 μm of at least 50 kg/m³ concrete. Thus, the UHPFRC has a granular skeleton optimized on several scales to favour packing density. The formulations are therefore based on additions of very fine particles (d50<5 μm) such as silica fumes, silica fillers or ultrafine limestones;
- a very low water content: a water/cement mass ratio ranging between 0.15 and 0.25,
- a high proportion of additives, in particular superplasticizers, ranging between 10 and 35 kg in dry extract per m³ concrete.

Superplasticizers (also referred to as adjuvants) can be added in order to modify the workability of concrete (such adjuvants are known as "water reducers"), to modify concrete setting and curing, to modify concrete properties (these are mass waterproofing or water-retaining adjuvants intended to reduce the bleeding tendency for example).

Water reducers are used to reduce the amount of water present in the fresh mix state of the concrete, which allows, among other things, to reduce the concrete porosity.

Water retainers can be superabsorbent polymers such as cellulose ethers, methylcellulose, hydroxyethyl methyl cellulose, hydroxypropyl methyl cellulose and carboxymethylcellulose for example. They have the effect of absorbing a large part of the free water content of concrete and of preventing this absorbed water from leaving the concrete.

Mass waterproofing adjuvants such as water-soluble fatty acid salts are used to reduce the capillary absorption and therefore the permeability of the water in concrete. Stearates are good mass waterproofing adjuvants.
- a fibre content, metallic and/or polymer fibres for example, preferably metallic, steel for example, in high proportions: between 2% and 10% by volume.

When using a UHPFRC of this type, the compressive mechanical strength of the UHPFRC is at least 130 MPa and it has a ductile behaviour. It is therefore suited for carrying gas at pressures above 70 bar.

According to one embodiment example, a UHPFRC meeting the following composition can be selected (of course, the composition is given upon preparation of the UHPFRC, i.e. upon mixing):
- cement (of 52.5 class or similar for example): 700 to 1000 kg/m³,
- fine sand, silica or calcareous sand, of particle size <1 mm: 800 to 1200 kg/m³,
- fine mineral filler (d50 between 10 and 50 μm), silica or calcareous: 150 to 250 kg/m³,
- ultrafine (d50<5 μm) or nanometric mineral filler (selected from among silica fumes, calcareous or silica microfiller for example): 50 to 250 kg/m³,
- fibres that can be made of metal (steel, stainless steel for example), polymer (polyvinyl acetate PVA or polypropylene PP for example), or glass, the diameter of the fibres ranging between 0.1 and 0.3 mm and the length between 10 and 20 mm, the proportion of fibres ranging between 2% and 10% by volume.

When the fibres are metallic, the UHPFRC is known as type A concrete. When the fibres are not metallic (polymer, glass), the UHPFRC is known as type M concrete.
- plasticizing or superplasticizing adjuvants: 10 to 35 kg/m³ (dry extract). For UHPFRC, adjuvants such as polycarboxylates (water reducer), polyacrylates (superabsorbent polymer), naphthalene derivatives (water reducer) and/or sulfonated melanines (water reducer) are preferably selected;

total water: between 15% and 25% by mass of the amount of cement. It is noted that the low water/cement ratio allows the porosity to be drastically reduced, thereby reducing the concrete carbonation phenomenon.

Furthermore, mass waterproofing adjuvants can also be preferably added, for example water-soluble fatty acids such as stearates, which decrease the capillary absorption and therefore provide very low porosity, thus limiting possible $CO_2$ attacks even further.

Compositions 1 and 2 hereafter are given by way of non-limitative example:

TABLE 1

|  | Composition 1 | Composition 2 |
| --- | --- | --- |
| 52.5R cement | 750 kg | 1 075 kg |
| Fine sand | 1 020 kg | 1 050 kg |
| Ground quartz | 200 kg | 160 kg |
| Silica fume | 230 kg | 50 kg |
| Metallic fibres | 160 kg | 220 kg |
| Superplasticizer (dry extract) | 10 kg | 35 kg |
| Water | 140 L | 200 L |

Using ultra-high performance fibre-reinforced concretes (UHPFRC) allows to increase the prestress level of the concrete, which in turn allows to increase the internal pressure it can withstand or to reduce the thickness of the concrete. However, mechanical sizing is not sufficient to allow pressurized gas to be transported in the pipe in total safety, since a brittle behaviour would involve high risks for people's and environmental safety.

Unlike usual concrete (non-UHPFRC), UHPFRC has a ductile behaviour and not a purely brittle behaviour. Therefore, UHPFRC is neither brittle in compression nor in bending, which provides a safer behaviour in case of accidental loading. In other words, selecting UHPFRC allows the resilience of the tubular element according to the invention to be increased. Indeed, the UHPFRC layer has the ability to deform until cracks allowing leakage of gas under pressure are generated, but without exploding. Indeed, the fibres and the composition of UHPFRC allow deformation of the concrete until cracks appear, without ruining the structure because the fibres maintain the structure and its mechanical strength capacities even after the cracks appear. This specific feature enables the pipe not to explode by allowing deformations. This feature allows safe use of the UHPFRC pipe for carrying gases at an internal pressure above 70 bar (i.e. 7 MPa).

Besides, selecting UHPFRC for the prestressed concrete layer allows to maintain over time the mechanical strength of the pipe according to the invention. Indeed, UHPFRCs have excellent fatigue and creep strength in relation to ordinary concrete, which is suitable for withstanding high mechanical stresses cyclically and possibly with temperature variations.

According to one embodiment, the prestressed concrete layer can also fulfill a sealing function. Indeed, the permeability of the UHPFRC selected for producing the pipe according to the invention is far lower (of the order of a hundred times less) than that of ordinary concretes. Thus, the prestressed UHPFRC layer can satisfactorily provide partial sealing against the gas contained in the pipe. Using a water-reducing adjuvant allows the porosity to be reduced. Thus, the sealing capacities of the prestressed UHPFRC layer allow possible partial degradation or failure of the sealing layer while limiting restoration operations.

Due to its high mechanical properties, UHPFRC allows relatively thin walls to be considered for the pipe (of the order of 4 times thinner according to some estimates). Considering the high cost of the material, this is a significant point for the economic viability of the invention. This aspect becomes particularly critical in cases where a failure of the sealing layer is considered. In this case, the pressurized gas contained in the pipe invades the concrete pores, which generates tensile stresses of poromechanical origin likely to damage the material. This type of failure is unstable and likely to generate sudden casing breakage. If the integrity of the sealing layer cannot be guaranteed 100% (a likely scenario considering the risk levels associated with this type of pipe), the prestress exerted on the concrete needs dimensioning so as to guarantee that the material is never subjected to tensile stresses, even in cases where the sealing layer is compromised. With ordinary concrete, this criterion is particularly binding, generating significant oversizing in terms of concrete thickness and prestressing wire section, of the order of 60% in thickness according to some estimates. Oversizing is much more limited when using a UHPFRC (of the order of 20% in thickness) due to the higher compressive strength of the material, which increases its ability to withstand high prestresses.

Preferably, the concrete making up the prestressed concrete layer can be selected from among UHPFRCs comprising metallic steel fibres and having a compressive strength above 130 MPa, preferably close to 150 MPa.

Advantageously, the concrete making up the prestressed concrete layer can be selected from among UHPFRCs comprising metallic steel fibres and having a tensile strength defined as at least low strain-hardening in the sense of the NF P18-470 standard (class T2), preferably defined as high strain-hardening in the sense of the NF P18-470 standard (class T3).

The section of the tubular elements can have any shape, notably circular or polygonal, octagonal for example. The inside of the tubular element delimits the area where the fluid under pressure can circulate to be transported from a first location to a second location at a distance from the first.

Advantageously, the pipe can extend over several kilometers, for example by assembling the various tubular elements end to end.

Preferably, the prestressed concrete layer can be selected from among UHPFRCs meeting at least one of the following criteria:
the prestressed concrete comprises aggregates of different sizes, the maximum size of the aggregates being less than 7 mm, preferably less than 1 mm, and the proportion of aggregates of grain size d50<5 μm being at least greater than 50 kg/m³ concrete.

Advantageously, the fibre content of the UHPFRC can range between 50 and 250 kg/m³, preferably between 150 and 240 kg/m³. The ductile behaviour is thus improved.

According to one variant of the invention, the circumferential mechanical reinforcement layer can consist of circumferential metal elements arranged around or in the prestressed concrete layer, the circumferential metal elements being tensionally prestressed. Thus, the tensile strength of the metal elements is above 150 MPa, which ensures concrete prestress. To provide prestress, the metal elements are subjected to a tensile stress during drying of the concrete. Thus, after drying of the concrete, the tensile stress on the metal elements is stopped and the concrete is then under compressive prestress.

Preferably, the circumferential metal elements can be selected from among metal wires, metal bands, metal rings, metal cables. These various elements can thus be wound around the concrete layer or in the concrete layer. Winding of the metal elements makes generation of the prestress easier.

According to one implementation of the invention, the circumferential tensile prestress can be obtained by winding under tension circumferential metal elements around the concrete tube, by winding metal wires, cables or bands for example. According to another embodiment, the circumferential metal elements are fitted into ducts reserved in the concrete tube during concrete pouring, prestressed and bonded to the concrete tube by injecting a cement slurry that fills the space left free in the concrete duct. Preferably, the circumferential metal elements are arranged on the periphery, i.e. around and in contact with the prestressed concrete layer.

Alternatively, the circumferential metal elements can be embedded in the prestressed concrete layer. In this case, the circumferential metal elements are preferably arranged in the half (the half is defined by the part obtained by delimiting the tube consisting of the prestressed concrete layer into two halves corresponding to two concentric superposed tubes of equal thickness) of the prestressed concrete layer located on the outer side of the pipe.

Advantageously, the circumferential metal elements can be evenly distributed in or on the concrete layer, so as to apply a homogeneous prestress onto the concrete layer.

According to one configuration of the invention, the tubular element can comprise a protective layer arranged on the outer surface of the prestressed concrete layer when the circumferential reinforcement layer is embedded in the protective layer, or of the circumferential mechanical reinforcement layer when it is positioned on the outer surface of the prestressed concrete layer. The protective layer allows to protect the circumferential mechanical reinforcement layer against physical and/or chemical attacks from the environment, for example to prevent corrosion related to the outside environment and/or friction of the circumferential mechanical reinforcement layer.

In some cases, the protective layer may be fluid sealed (liquid and/or gas) to prevent infiltration of such fluids into the concrete. It is thus possible for example to avoid water infiltration into the concrete, and thereby to avoid corrosion of the circumferential mechanical reinforcement layer.

Advantageously, the protective layer can be made of ordinary concrete (non-UHPFRC), mortar, asphalt or polymer, such as polyethylene or polytetrafluoroethylene.

According to a configuration of the invention, the prestressed concrete layer (the wall) can comprise at least one axial mechanical reinforcement layer consisting of one or more longitudinal metal elements arranged in the prestressed concrete layer, said one or more longitudinal metal elements being tensionally prestressed. The longitudinal tensile strength is thus improved.

Thus, on the one hand, the purpose of the axial mechanical reinforcement layer consisting of said one or more longitudinal metal elements is to decrease the axial stress carried by the concrete layer when the pipe according to the invention is under high pressure. On the other hand, the purpose of the axial mechanical reinforcement layer consisting of said one or more longitudinal metal elements is to maintain the concrete layer in a situation of compressive stress over the widest internal pressure load range of the pipe, which allows to make the most of the excellent compressive strength characteristics of the concrete and therefore to minimize the concrete layer thickness.

The metal elements can be readily incorporated in the wall (the prestressed concrete layer) during concrete production, and such elements can also be subjected to a tensile stress during concrete production and drying so as to generate a longitudinal prestress in addition to the circumferential prestress. In other words, said one or more longitudinal metal elements are embedded within the UHPFRC. The longitudinal metal elements are preferably arranged on or next to the median plane of the prestressed concrete layer (the median plane is defined as the plane equidistant from the inner surface and the outer surface of the tube). According to one embodiment, the longitudinal metal elements are arranged on and distributed over two tubular planes whose diameters are inscribed in the prestressed concrete layer.

Said one or more longitudinal metal elements are tensionally prestressed and they therefore impose a compressive prestress in the direction of the pipe axis, in the prestressed concrete layer at least when the pipe is at rest.

Advantageously, said one or more longitudinal metal elements are selected from among a metal tube, metal wires, metal cables or metal bands.

Advantageously, the longitudinal metal elements can be evenly distributed in the concrete layer so as to apply a homogeneous prestress onto the concrete layer.

According to one implementation of the invention, the sealing layer is selected from among a metal layer, notably made of steel, a polymer layer, notably made of polytetrafluoroethylene (PTFE), or a UHPFRC layer with a water-retaining adjuvant intended to reduce porosity and therefore $CO_2$ permeability. These materials are sealed against fluids and notably gases such as $CO_2$. Furthermore, they are chemically compatible with inner fluids. When the sealing layer is metallic, it may be necessary to judiciously select the steel grade so as to improve the lifetime of the sealing layer with the inner fluid. Stainless steel such as duplex steel can therefore be selected for example.

A polymer sublayer allows to reduce the weight and the cost of the sealing layer, while a metal sublayer provides better mechanical characteristics.

According to a variant embodiment, the sealing layer can be provided by a first sublayer made of concrete (UHPFRC with a water-retaining adjuvant to reduce porosity and therefore $CO_2$ permeability), followed by a second sublayer made of metal, preferably steel. The purpose of the first concrete sublayer is to protect, on the one hand, the inner face of the steel sublayer against physical and/or chemical damage (notably corrosion), to prevent collapse of this sublayer (due to the prestresses applied to the steel wires) an, in general, to withstand the stress induced by the fluid under pressure.

In a particular embodiment of the invention, the axial mechanical reinforcement layer and the sealing layer are made of a single element consisting of a steel tube.

In a particularly advantageous manner, the pipe can comprise a plurality of tubular elements, each tubular element comprising a male fitting end or a female fitting end at each longitudinal end of the tubular element, so as to be able to assemble two tubular elements with one another, the male fitting end or the female fitting end comprising a seal means. Thus, each tubular element can comprise, at one longitudinal end, a male fitting end and, at the other longitudinal end, a female fitting end. Thus, assembly of the elements with one another is facilitated and the tubular elements are all identical, which simplifies the logistics and can reduce the manufacturing cost. Alternatively, some tubular elements can comprise male fitting ends at both longitudinal ends, while other tubular elements can comprise female fitting ends at both longitudinal ends. Thus, it is possible to successively assemble a tubular element with two male fitting ends, then a tubular element with two female fitting ends to generate the pipe. In other words, the pipe can be made up of a series alternating a tubular element with two male fitting ends and a tubular element with two female fitting ends.

According to a provision of the invention, the tubular element comprises a thermal insulation layer positioned against the inner surface of the sealing layer. The purpose of this thermal insulation layer is to maintain the inner fluid at a temperature compatible with the desired fluid state. This thermal insulation layer notably allows to maintain $CO_2$ in the supercritical state, which favours gas transport in the pipe by limiting pressure drops and/or by increasing the internal flow rate for an equivalent mass flow rate.

Preferably, the thermal insulation layer can be made of cellular concrete (also referred to as aerated concrete, and better known as SIPOREX™). Cellular concrete is a concrete wherein air bubbles are intentionally occluded (by a chemical or mechanical process) during production, hence the designation "cellular" or "aerated" concrete. Cellular concrete can be made for example from sand, lime and cement, or from sand, cement, aluminium powder or aluminium paste. It is thus made up of a light insulating mortar (density: 0.4 to 1.3) due to the presence of many air or gas inclusions. This mixture forms air cells (or holes) enclosed and separated by thin concrete walls.

It can be manufactured in an autoclave in form of blocks or panels, and its dimensions can be adjusted by cutting with a hand saw. Cellular concrete has poor crush resistance (due to the internal or external pressure for example), it is therefore necessary to position it inside the pipe, i.e. from the inside of the pipe, before the sealing layer. Thus, the cellular concrete is subjected to an equi-pressure that provides crush protection, which is beneficial to reduce pressure drops.

In a configuration of the invention, the ultra-high performance fibre-reinforced concrete can have a tensile strength above 6 MPa and/or a water porosity below 6% and/or a gas permeability of the order of $5 \cdot 10^{-13}$ m$^2$/s. It may notably be DUCTAL™.

FIG. 1 schematically illustrates, by way of non-limitative example, a pipe according to an embodiment of the invention. The pipe has a running section 1 within which a fluid such as gas can flow so as to be transported from a first location to a second location at a distance from the first. Running section 1 has a tubular shape extending along axis A. In connection with FIG. 1, running section 1 of the pipe has a cylindrical shape with a circular section of axis A. Running section 1 consists of several tubular elements 1a, 1b, . . . 1c. Tubular elements 1a, 1b, 1c are assembled end to end in a sealed manner, for example by connections of the type shown in FIG. 7. At both longitudinal ends of the pipe, the fluid flow area is open so as to allow continuous fluid flow. The pipe may be installed on the ground, but it is preferably partly or totally buried in the ground.

FIGS. 2, 3 and 4 schematically illustrate, by way of non-limitative example, a running section 1 of a tubular element of a pipe according to three embodiments of the invention. Each one of FIGS. 2, 3 and 4 is a 3D cross-sectional view of running section 1.

In connection with FIG. 2, from the inside to the outside of running section 1, running section 1 of the tubular element comprises a sealing layer 5, a mechanical resistance layer 6 made of UHPFRC covered by a circumferential mechanical reinforcement layer 8, and a protective layer 9. Circumferential mechanical reinforcement layer 8 is made up of tensionally prestressed metal wires wound around mechanical resistance layer 6. Furthermore, mechanical resistance layer 6 can be traversed by metal wires 7 making up the axial mechanical reinforcement layer that is optional here. Metal wires 7 are tensionally prestressed. The metal wires making up circumferential mechanical reinforcement layer 8 are evenly distributed over the length of running section 1, and the metal wires making up axial mechanical reinforcement layer 7 are evenly distributed over the circumference of running section 1. Protective layer 9, made of mortar for example, is notably intended to protect the prestressed metal wires of layer 8 against corrosion and against friction thereof in or on the ground. Sealing layer 5 is pressed onto the inner wall (surface) of mechanical resistance layer 6. Sealing layer 5 can be made of PTFE (polytetrafluoroethylene).

In connection with FIG. 3, from the inside to the outside of running section 1, the running section comprises a sealing layer 5, a mechanical resistance layer 6 made of UHPFRC, a circumferential mechanical reinforcement layer 8 arranged within the UHPFRC of mechanical resistance layer 6. Furthermore, mechanical resistance layer 6 is optionally traversed by metal wires 7 that make up the axial mechanical reinforcement layer (optional layer). Metal wires 7 are tensionally prestressed. Metal wires 8 are arranged in mechanical resistance layer 6 at a distance Y greater than distance X of metal wires 7 making up the axial mechanical reinforcement layer, if any, each distance X and Y being measured with respect to the pipe axis. The metal wires that make up circumferential mechanical reinforcement layer 8 are evenly distributed over the length of running section 1, and the metal wires that make up axial resistance layer 7 are advantageously evenly distributed over the circumference of running section 1.

In connection with FIG. 4, from the inside to the outside of running section 1, running section 1 comprises a sealing layer (not shown), a mechanical resistance layer 6 made of UHPFRC and a circumferential mechanical reinforcement layer 8 arranged within the UHPFRC of mechanical resistance layer 6. Furthermore, mechanical resistance layer 6 is traversed by a metal tube 7 making up the axial mechanical reinforcement layer (which is optional). Metal tube 7 is tensionally prestressed along the pipe axis. Metal tube 7, when used, has a radius of value X less than distance Y, a distance measured with respect to the pipe axis, at which metal wires 8 making up the circumferential mechanical reinforcement layer are arranged. The metal wires making up circumferential mechanical reinforcement layer 8 are evenly distributed over the length of running section 1. In this embodiment, the purpose of metal tube 7 is also to provide sealing of the pipe.

FIGS. 5 and 6 compare the behaviour of a tubular element subjected to an internal pressure of 125 bar (with no external back pressure) with a mechanical resistance layer made of ordinary concrete according to the prior art and a mechanical resistance layer made of UHPFRC according to the invention.

FIGS. 5 and 6 respectively show, for the pipes made of ordinary concrete according to the prior art and of UHPFRC according to the invention respectively, a sectional view in the thickness of the tubular element layers, in a longitudinal plane. FIGS. 5 and 6 only show prestressed concrete layer 6 and circumferential mechanical reinforcement layer 8 made up of steel cables. The left side of FIGS. 5 and 6 corresponds to the centre of the pipe and the right side of FIGS. 5 and 6 corresponds to the outside of the pipe. In the concrete layer shown in FIGS. 5 and 6, the grey scale areas represent the plastic deformation corresponding to concrete cracking. The behaviour difference between the ordinary concrete of the pipe according to the prior art and the UHPFRC of the pipe according to the invention is immediately apparent. FIG. 5 shows, in the ordinary concrete layer, the formation of a crack 10 at the edge of the damaged zone that propagates towards the inside of the tubular element. This crack is likely to generate failure and to jeopardize the integrity of the structure. FIG. 6 shows, in the UHPFRC layer of the pipe according to the invention, more limited and diffuse damage (area 11) that remains confined to the outer surface of the prestressed concrete layer. Furthermore, the UHPFRC retains a major part of its mechanical capacities in FIG. 6 in relation to FIG. 5. Therefore, in addition to the mechanical performances due to UHPFRC, using UHPFRC for a fluid transport pipe, notably for gas transport, unexpectedly allows to increase the resilience of the pipe. Thus, the ordinary concrete pipe is not suitable for pressurized gas transport (up to 150 bar), whereas the UHPFRC pipe according to the invention is suitable for such a use.

FIG. 7 schematically illustrates, by way of non-limitative example, an example of connecting means between tubular elements 1a, 1b of axes A for assembling them end to end so as to create a pipe.

In order to facilitate connection between tubular elements 1a and 1b, a longitudinal end of a tubular element, here tubular element 1b, comprises a male fitting end 21. Male fitting end 21 is represented here by a section of inside and outside diameter identical to that of tubular element 1b. In order to favour fitting and sealing, the surface of the outside diameter of male fitting end 21 can be polished so as to prevent damage to seal 22.

The other tubular element to be connected, here tubular element 1a, has a longitudinal end provided with a female fitting end 20 comprising a shoulder.

A seal 22 is positioned between the outside diameter of male fitting end 21 and the inside diameter of female fitting end 20 so as to provide sealing of the connection against the inner fluid.

Male fitting end 21 is configured to fit into the shoulder of female fitting end 20, thus providing end-to-end assembly of tubular elements 1a and 1b.

The shoulder of female fitting end 20 comprises a cylindrical element part with an inside diameter greater than or equal to the outside diameter of male fitting end 21, and suited for setting seal 22 between male fitting end 21 and female fitting end 20.

The invention claimed is:

1. A pipe for transporting gas, comprising at least one tubular element, the tubular element comprising a juxtaposition of concentric layers comprising, from inside to outside, at least one sealing layer, a prestressed concrete layer and at least one circumferential mechanical reinforcement layer, wherein the concrete making up the prestressed concrete layer is selected from among ultra-high performance fibre-reinforced concretes comprising a concrete reinforced with metallic and/or polymer fibres and having a compressive strength greater than 130 MPa.

2. A pipe as claimed in claim 1, wherein the concrete making up the prestressed concrete layer is selected from among ultra-high performance fibre-reinforced concretes comprising steel metal fibres and having a compressive strength greater than 130 MPa.

3. A pipe as claimed in claim 1, wherein the concrete making up the prestressed concrete layer is selected from among ultra-high performance fibre-reinforced concretes meeting at least one of the following criteria:
the prestressed concrete comprises aggregates of different sizes, the maximum size of the aggregates being less than 7 mm, preferably less than 1 mm, and the proportion of aggregates of grain size d50<5 µm being at least greater than 50 kg/m$^3$ concrete,
a proportion of cement ranging between 700 and 1000 kg/m$^3$ concrete,
a water/cement mass ratio ranging between 0.15 and 0.25,
a proportion of additives, in dry extract, ranging between 10 and 35 kg/m$^3$ concrete,
a proportion of fibres ranging between 2% and 10% by volume.

4. A pipe as claimed in claim 1, wherein the at least one circumferential mechanical reinforcement layer is made up of circumferential metal elements arranged around or in the prestressed concrete layer, the circumferential metal elements being tensionally prestressed.

5. A pipe as claimed in claim 4, wherein the circumferential metal elements are selected from among metal wires, metal bands, metal rings, metal cables.

6. A pipe as claimed in claim 1, wherein the at least one tubular element further comprises a protective layer arranged on the outer surface of the prestressed concrete layer, and circumferential mechanical reinforcement layer can be embedded in the protective layer.

7. A pipe as claimed in claim 1, wherein the prestressed concrete layer comprises at least one axial mechanical reinforcement layer consisting of one or more longitudinal metal elements arranged in the prestressed concrete layer, the one or more longitudinal metal elements being tensionally prestressed.

8. A pipe as claimed in claim 7, wherein the one or more longitudinal metal elements is selected from among a metal tube, metal wires, metal cables or metal bands.

9. A pipe as claimed in claim 1, wherein the at least one sealing layer is selected from among a metal layer, a polymer layer, or a juxtaposition of an inner concrete sublayer and an outer metal sublayer or a polymer sublayer.

10. A pipe as claimed in claim 1, wherein the at least one tubular element comprises a plurality of tubular elements, each of the plurality of tubular elements comprising a male fitting end or a female fitting end at each longitudinal end, so as to be able to assemble two tubular elements with one another, the male fitting end or female fitting end comprising a seal means.

11. A pipe as claimed in claim 1, wherein the at least one tubular element comprises a thermal insulation layer positioned against the inner surface of the at least one sealing layer.

12. A pipe as claimed in claim 11, wherein the thermal insulation layer is made of cellular concrete.

13. A pipe as claimed in claim 1, wherein the pipe is configured to transport carbon dioxide.

14. A pipe as claimed in claim 1, wherein the at least one sealing layer is selected from among a metal layer made of steel, a polymer layer made of polytetrafluoroethylene, or a juxtaposition of an inner concrete sublayer and an outer metal sublayer made of steel or a polymer sublayer made of polytetrafluoroethylene.

* * * * *